(12) United States Patent
Heibel et al.

(10) Patent No.: US 7,980,065 B2
(45) Date of Patent: Jul. 19, 2011

(54) REGENERATION METHOD FOR CERAMIC HONEYCOMB STRUCTURES

(75) Inventors: Achim Karl-Erich Heibel, Corning, NY (US); Joshua Adam Jamison, Corning, NY (US); Paul Michael Schelling, Corning, NY (US)

(73) Assignee: Corning Incorporated, Corning, NY (US)

( * ) Notice: Subject to any disclaimer, the term of this patent is extended or adjusted under 35 U.S.C. 154(b) by 995 days.

(21) Appl. No.: 11/880,065

(22) Filed: Jul. 19, 2007

(65) Prior Publication Data
US 2009/0019831 A1   Jan. 22, 2009

(51) Int. Cl.
*F01N 3/00* (2006.01)
*F01N 3/02* (2006.01)

(52) U.S. Cl. ............... 60/295; 60/274; 60/285; 60/297; 60/311

(58) Field of Classification Search ............ 60/273, 60/285, 295, 297, 301, 311, 274; 95/11, 95/21, 273, 274, 276, 278, 279, 283, 285
See application file for complete search history.

(56) References Cited

U.S. PATENT DOCUMENTS

| | | | |
|---|---|---|---|
| 3,790,654 A | 2/1974 | Bagley | 264/177 |
| 3,885,977 A | 5/1975 | Lachman et al. | 106/62 |
| 3,905,743 A | 9/1975 | Bagley | 425/464 |
| 4,992,233 A | 2/1991 | Swaroop et al. | 419/2 |
| 5,011,529 A | 4/1991 | Hogue et al. | 75/235 |
| 5,320,999 A * | 6/1994 | Muramatsu et al. | 502/303 |
| 6,574,956 B1 | 6/2003 | Moraal et al. | 60/295 |
| 6,829,890 B2 | 12/2004 | Gui et al. | 60/295 |
| 6,843,055 B2 | 1/2005 | Ootake | 60/297 |
| 6,862,927 B2 | 3/2005 | Craig et al. | 73/118.1 |
| 2002/0104312 A1 | 8/2002 | Hoffman et al. | 60/286 |
| 2003/0131592 A1 * | 7/2003 | Saito et al. | 60/295 |
| 2003/0226352 A1 | 12/2003 | Chandler et al. | 3/10 |
| 2004/0261384 A1 * | 12/2004 | Merkel et al. | 55/523 |
| 2005/0022505 A1 | 2/2005 | Kitahara | 60/274 |
| 2005/0137776 A1 | 6/2005 | Gioannini et al. | 701/101 |
| 2008/0045405 A1 * | 2/2008 | Beutel et al. | 502/103 |

FOREIGN PATENT DOCUMENTS
| | | | |
|---|---|---|---|
| EP | 0 341 832 | 11/1989 | 3/2 |
| WO | 2006/044764 | 4/2006 | 53/94 |

* cited by examiner

*Primary Examiner* — Thomas E Denion
*Assistant Examiner* — Audrey Klasterka
(74) *Attorney, Agent, or Firm* — Joseph M. Homa

(57) ABSTRACT

A method for regenerating a diesel particulate filter includes elevating a temperature of a gas stream flowing into an inlet of the diesel particulate filter to greater than or equal to 450° of the inlet of the diesel particulate filter, wherein the gas stream at the inlet of the diesel particulate filter contains an amount of NOx of equal to or greater than 300 ppm, and an amount of $O_2$ of equal to or greater than 5% volume, thereby burning the soot within the diesel particulate filter. The method also includes elevating a temperature of the gas stream flowing into the inlet of the diesel particulate filter to less than or equal to 550° C. at the inlet of the diesel particulate filter, wherein a burn rate of soot from porous watts of the diesel particulate filter is greater than or equal to 3.8 grams/liter/hour.

24 Claims, 12 Drawing Sheets

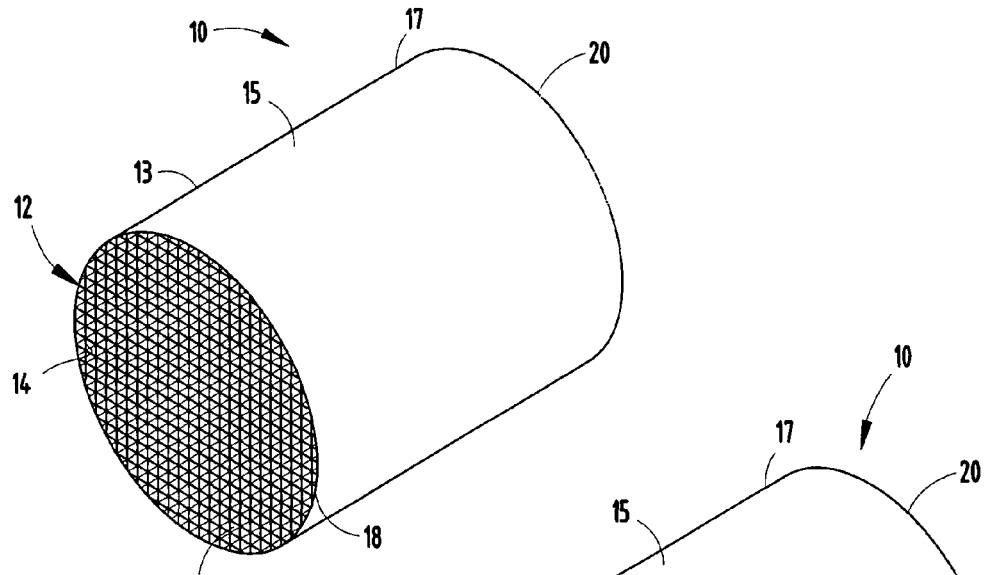
FIG. 1 PRIOR ART
FIG. 2 PRIOR ART
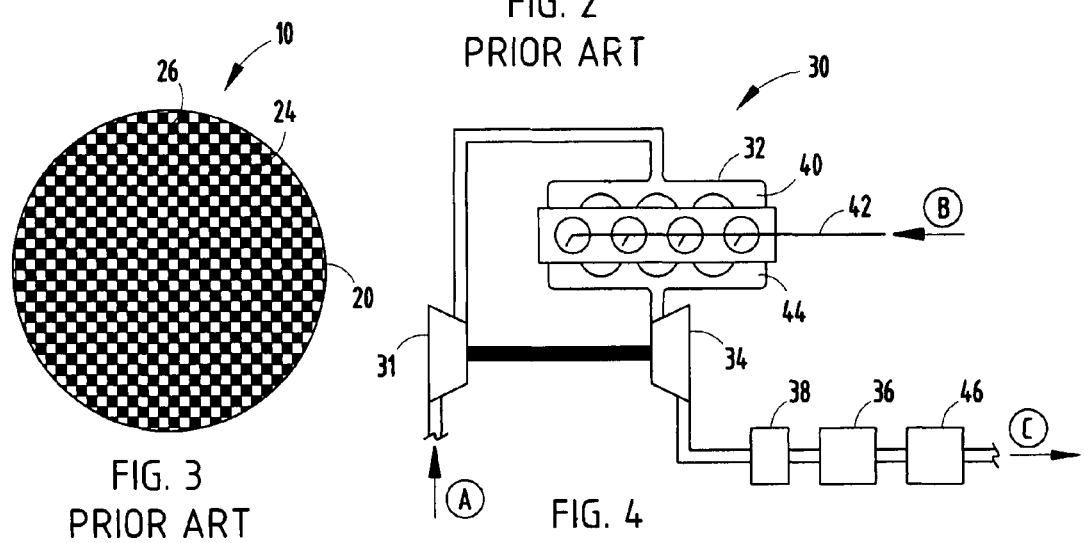
FIG. 3 PRIOR ART
FIG. 4

REGENERATION METHOD FOR CERAMIC HONEYCOMB STRUCTURES

BACKGROUND OF THE INVENTION

1. Field of the Invention

This invention relates to the regeneration of ceramic honeycomb structures such as diesel particulate filters, and in particular, to a method for regenerating a ceramic honeycomb body that includes treatment of particulate mass, such as carbon soot in diesel particulate filters.

2. Description of Related Art

In an attempt to reduce atmospheric pollution, many countries are imposing increasingly stringent limits on the composition of exhaust gases produced by internal combustion engines and released into the atmosphere. The primary harmful substances from diesel engines, apart from small amount of hydrocarbons and carbon monoxide, are nitrogen oxides (NOx) and particulate matter.

Heretofore, many methods have been proposed in an attempt to reduce or minimize the quantity of particulate matter present in the exhaust gases emitted into the environment. Once such one widely utilized method is the placement of a diesel particulate filter or soot trap, in the exhaust system associated with the engine. Generally, a particulate filter consists of parallel channels with porous walls that are obstructed alternately. Specifically, these filters typically comprise honeycomb structures having traverse cross-sectional cellular densities of approximately 1/10 to 100 cells or more per square centimeter, and have several uses, including solid particulate filter bodies and stationary heat exchangers. Such uses require selected cells of the honeycomb structure to be sealed or plugged by manifolding and the like at one or both of the respective ends thereof. The manufacture of various honeycomb structures from plasticized powder batches comprising inorganic powders dispersed in appropriate binders is well known. U.S. Pat. Nos. 3,790,654; 3,885,977; and 3,905,743 describe extrusion dies, processes, and compositions for such manufacture, while U.S. Pat. Nos. 4,992,233 and 5,011,529 describe honeycombs of similar cellular structure extruded from batches incorporating metal powders.

As an example, FIG. 1 shows a well-known solid particulate filter body 10. The filter body 10 includes a honeycomb structure 12 formed by a matrix of intersecting, thin, porous walls 14 surrounded by an outer wall 15, which in the illustrated example is provided in a circular cross-sectional configuration. The walls 14 extend across and between a first end 13 that includes a first end face 18, and a second end 17 that includes an opposing second end face 20, and form a large number of adjoining hollow passages or cell channels 22 which also extend between and are open at the end faces 18, 20 of the filter body 10. To form the filter 10 (FIGS. 2 and 3), one end of each of the cells 22 is sealed, a first subset 24 of the cells 22 being sealed at the first end face 18, and a second subset 26 of the cells being sealed at the second end face 20. Either of the end faces 18, 20 may be utilized as the inlet face of the resulting filter 10. In a typical cell structure, each inlet cell channel is bordered on one or more sides by outlet cell channels and vice versa. Each cell channel 22 may have a square cross section or may have other cell geometry, e.g., circular, rectangular, triangular, hexagonal, etc. Diesel particular filters can be made of ceramic materials, such as cordierite, aluminum titinate, mullite or silicon carbide.

In operation, contaminated fluid is brought under pressure to an inlet face (either of the end faces 18, 20) and enters the filter 10 via cell channels 22 which have an open end at the given inlet face. Because these cell channels 22 are sealed at the opposite end face, i.e., the outlet face of the body, the contaminated fluid is forced through thin porous walls 14 into adjoining cell channels 22 which are sealed at the inlet face and open at the outlet face. The solid particulate contaminant in the fluid, which is too large to pass through the porous openings in the walls 14, is left behind and a cleansed fluid exits the filter 10 through the outlet cell channels 22.

The particulate matter captured by the particulate filter must occasionally be removed therefrom in order to preserve the performance of the filter, and as a result the performance of the associated engine, as well as to help prevent destruction of the particulate filter in the event of self-priming and uncontrolled combustion of the particulate matter trapped within the particulate trap. For example, as large amounts of particulate matter accumulate within the particulate filter, particular driving conditions can cause a trigger of "critical" regeneration, consisting of sudden and uncontrolled combustion of the trapped particulate matter. As a result, high temperatures can be generated inside the channel matrix of the particulate filter causing damage thereto.

It is therefore beneficial to periodically remove the particulate matter which has accumulated within the trap by performing a regeneration process. As noted, regenerations are a necessary process for a wall flow DPF technology to avoid engine damage and fuel efficient engine operation by eliminating high back pressure and maintaining effective filtration performance. Regeneration typically involves a means of combusting the particulate matter which has accumulated within the filter. This process typically comprises burning the particulate matter or soot, consisting mostly of carbon, that is in contact with the oxygen present in the exhaust gases. However, this particular reaction takes place naturally only at temperatures higher than about 600° C., which is significantly higher than those temperatures measured at the intake of the particulate filter in a normally functioning engine. It is therefore necessary to create conditions resulting in the regeneration of the filter by burning of the associated particulate matter. Many methods have been proposed and/or used in order to increase the temperature of the exhaust gases at the intake of the particulate filter to trigger a regeneration thereof.

Two types of regeneration processes are generally employed, including passive regeneration and active regeneration. Passive regeneration occurs when the engine produces filter inlet temperatures above 250° C. and enough NO to result in soot oxidation by $NO_2$. A catalyst is required to convert NO to $NO_2$ to support passive regenerations. Typically, the passive regeneration window is restricted to between 400° C. and 450° C., as the $NO_2$ effect is limited by thermal dynamic equilibrium. Active regenerations are forced regenerations which cause the filter inlet temperature to rise to a range of higher than 500° C., thus resulting in a burnout of the majority of the carbon soot with oxygen contained within the exhaust gases. Many engines utilize fuel and diesel oxidation catalysts located upstream of the particulate filter to achieve temperatures as hot as 650° C. The diesel oxidation catalyst is a monolithic substrate without any plugs therein and that utilizes HC and $O_2$ to generate heat. Still other engines use a burner system to generate the heat for active regenerations. The filters are commonly catalyzed with an oxidation catalyst to improve regeneration performance, i.e., to achieve lower regeneration temperatures, as well as to reduce emissions from the soot oxidation.

Soot oxidation may occur when the exhaust gas comprises a requisite amount of soot and oxygen at a high energy temperature. Regeneration with oxygen requires temperatures of greater than 500° to 550° C. to gain a significant portion of soot oxidation. However, when temperatures reach 550° to 650° C. there is an increased risk of an uncontrolled soot oxidation resulting in rapid heat release and therefore high exo-therms. Typical conditions resulting in uncontrolled regenerations are obtained for soot overloaded filters or regeneration conditions risking fast kinetics, i.e., high initiation temperatures and gas composition favorable to oxidation, and insufficient heat removal by absorption, convection or conduction. Uncontrolled regenerations risk damaging the filter by melting and cracking.

SUMMARY OF THE INVENTION

The method for at least partially regenerating a diesel particulate filter, wherein the diesel particulate filter comprises an inlet, an outlet, and a porous body comprising a plurality of porous walls disposed between the inlet and the outlet, wherein the gas stream flows into the inlet, through the diesel particulate filter, and out of the outlet, and wherein the porous walls contain an amount of carbon soot trapped in or on the porous walls, comprises elevating a temperature of the gas stream flowing into the inlet of the diesel particulate filter to greater than or equal to 450° C. at the inlet of the diesel particulate filter, wherein the gas stream of the inlet of the diesel particulate filter contains a relatively high amount of NOx, and an amount of $O_2$ of equal to or greater than 5% volume, thereby burning the soot and diesel particulate filter. Preferably, the temperature of the gas stream at the inlet of the particulate filter is greater than or equal to 450° C., more preferably with the range of between 450° C. and 600° C., even more preferably within the range of from about 450° C. and 575° C., and most preferably within the range from about 450° C. to 550° C., while the amount of NOx is preferably greater than or equal to 300 ppm, more preferably greater than or equal to 500 ppm, and most preferably greater than or equal to 750 ppm.

Another aspect of the present inventive method comprises elevating a temperature of the gas stream flowing into the inlet of the diesel particulate filter to less than or equal to 550° C. at the inlet of the diesel particulate filter, wherein the gas stream at the inlet of the diesel particulate filter contains an amount of $O_2$ of equal to or greater than 5% volume, and wherein the burn rate of the soot from the porous wall is preferably greater than or equal to 3.8 grams per liter per hour, more preferably greater than 4.2 grams/liter/hour and most preferably greater than or equal to 4.6 grams/liter/hour.

The present inventive method for regenerating a diesel particulate filter reduces the amount of particulate matter contained in or on a diesel filter in a safe and time efficient manner. Specifically, temperature ranges of less than those typically required to trigger an uncontrolled regeneration may be utilized to at least partially regenerate the associated particulate filter, thereby reducing the amount of particulate matter trapped within the particulate filter to levels at which a higher temperature regeneration scheme may be employed, thereby completely regenerating the filter. Further, the soot-loading interval can increase for active regenerations, resulting in longer intervals between regenerations and better fuel economy. The present inventive regeneration method improves the overall filter management strategy, providing safer regeneration conditions, more effective utilization of energy, and an increased flexibility to manage higher soot loads within the filters in a safe manner. As particulate matter is removed from the filter, the filter is regenerated.

In the embodiments disclosed herein, the plurality of porous walls is preferably provided in a honeycomb arrangement. Also, the diesel particulate filter is comprised of porous ceramic material, such as cordierite, preferably formed of a plurality of porous walls provided in a honeycomb arrangement.

BRIEF DESCRIPTION OF THE DRAWINGS

FIG. 1 is a perspective view of a known honeycomb body having a plurality of open-ended, longitudinally-extending channels;

FIG. 2 is a perspective view of a known diesel particulate filter having a plurality of alternately-plugged, longitudinally-extending channels and that may be regenerated via the present inventive method;

FIG. 3 is an end view of the known diesel particulate filter of FIG. 2;

FIG. 4 schematically illustrates a diesel engine system that may be employed to conduct the present inventive method;

DETAILED DESCRIPTION

Figure 5:
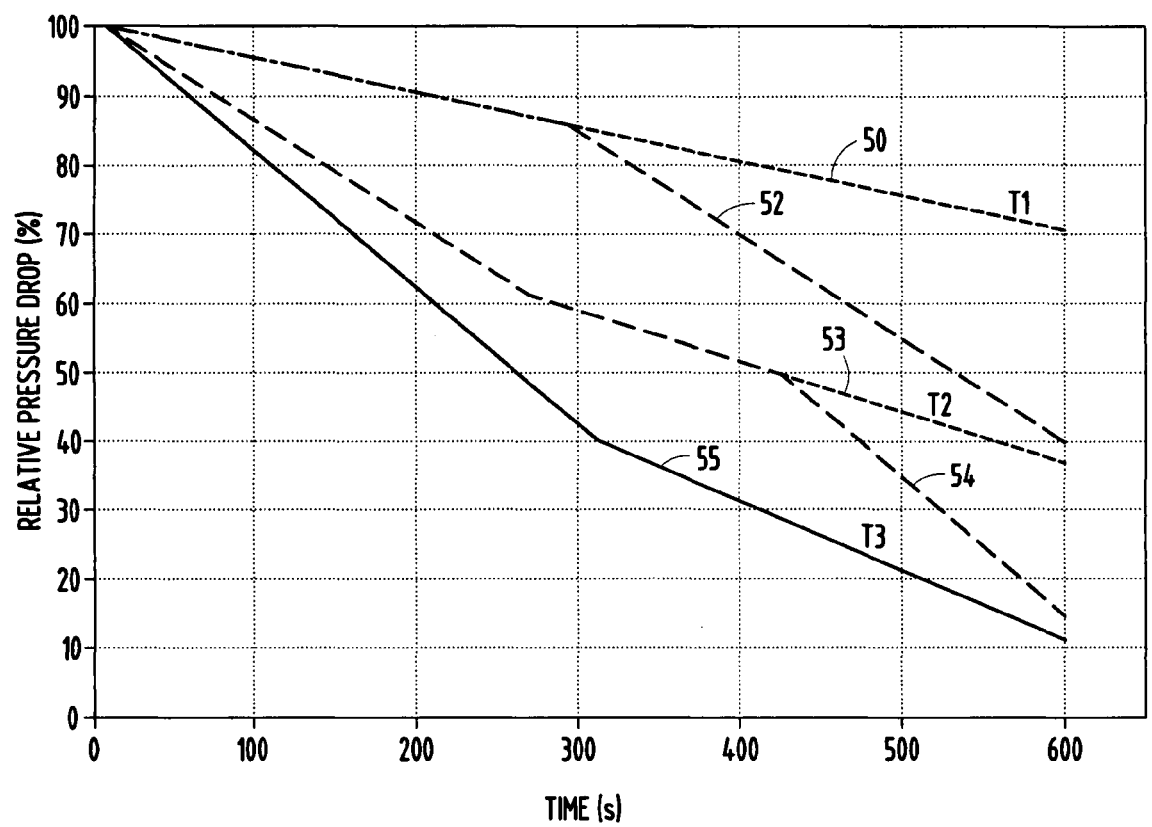
FIG. 5 schematically illustrates in graphical form the effect on soot loading, as reflected by relative pressure drop, as a function of regeneration time for various single stage and multi-stage regeneration schemes based on three different diesel particulate filter inlet temperatures.

It is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

FIG. 4 illustrates a schematic view of a diesel engine system 30 to which the present inventive method can be applied. The diesel engine system 30 includes a compressor 31, a diesel engine 32, a turbine 34 and a diesel particulate filter 36. Alternatively, the diesel engine system 30 may also include an oxidation catalytic converter or diesel oxidation catalysts 38. The diesel engine system 30 may also include a deNOx device 46, such as a selective catalytic reduction ("SCR") device that injects a fluid reductant such as ammonia or urea into the exhaust gas stream in the presence of a catalyst in order to convert the NOx via chemical reaction into $H_2O$ and $N_2$, thereby removing the NOx from the gas stream. In operation, air "A" is inducted and compressed by the compressor 31, thereby supplying compressed air to the diesel engine 32 via an intake manifold 40. Fuel "B" is injected into the diesel engine 32 via a plurality of fuel injectors 42, and is burned with air. Exhaust gases produced in the cylinders exit the diesel engine 32 via an exhaust manifold 44, with a portion of the exhaust gases flowing into the turbine 34 that in turn rotates the compressor 31. The exhaust gases "C" then flow into the exhaust gas after treatment system that includes the diesel particulate filter 36, preferably an oxide filter, and optionally also the oxidation catalytic converter 38, and preferably also the deNOx device 46.

The present inventive regeneration method comprises elevating the temperature of the exhaust gas stream at the inlet to the particulate filet to a temperature preferably of greater than or equal to 450° C., more preferably of greater than or equal to about 500° C., even more preferably to a temperature range of between 450° C. and 600° C., even more preferably to a temperature range of between 450° C. and 575° C., and most preferably to a temperature range of between 450° C. and 550° C., wherein the exhaust gas stream contains NOx preferably of greater than or equal to 300 ppm, more preferably of greater than or equal to 500 ppm, and most preferably of greater than or equal to 750 ppm, and $O_2$ preferably of greater than or equal to 5% vol, and more preferably of greater than or equal to 7% vol. This method may also be applied via a staged regeneration approach with the temperature of the exhaust gas stream at the inlet of the particulate filter being maintained at a temperature preferably within the range of between 450° C. and 550° C. for a period of 15 minutes, and subsequent elevating the temperature of the exhaust gas steam at the inlet of the particulate filter to a temperature of greater than or equal to 550° C., wherein the amount of NOx is equal to or less than 300 ppm at the inlet of the particulate filter during the second period. Further, when the method is employed in the regeneration of oxide particulate filters, the uncoated bulk density of the particulate filter is less than or equal to 700 grams/liter, more preferably less than or equal to 600 grams/liter.

In some embodiments, the method preferably comprises maintaining a burn rate of the soot from the porous walls of the particulate filter at preferably greater than or equal to 3.8 grams/liter/hour, more preferably at greater than or equal to 4.2 grams/liter/hour, and most preferably at greater than or equal to 4.6 gram/liter/hour, wherein the amount of NOx contained in the exhaust gas stream at the inlet of the diesel particulate filter is preferably equal to or greater than 300 ppm, more preferably greater than or equal to 500 ppm, and most preferably greater than or equal to 750 ppm. Further, this method may also be applied via the staged regeneration approach with the burn rate of the soot trapped in or on the porous wall of the particulate filter is preferably less than or equal to 6 grams/liter/hour, and more preferably less than or equal to 4 grams/liter/hour, and most preferably less than or equal to 3 grams/liter/hour, for a first period of time that is less than or equal to 15 minutes, followed by increasing the temperature of the exhaust gas stream at the inlet of the particulate filter to greater than or equal to 550° C.

FIG. 5 schematically illustrates, in graphical form, modeled results of the effect on soot loading, as reflected by relative pressure drop, as a function of regeneration time for various single stage and multi-stage regeneration schemes based on three different diesel particulate catalytic filter inlet temperatures for a representative filter at representative conditions. A 0% relative pressure drop corresponds to no soot in the diesel particulate filter, and 100% indicates a high soot loading. Dotted lines 50, 53, and 55 correspond to single stage regenerations conducted at temperatures T1, T2, and T3, respectively, wherein T1<T2<T3, for example 450° C., 550° C., and 600° C. After 10 minutes of regeneration, the soot level (relative pressure drop) is highest at T1, second highest at T2, and lowest at T3. Dashed lines 52 and 54 correspond to dual stage regenerations conducted (a) at T1 for 5 minutes and (b) at T2 for 5 minutes, and (a) at T2 for 7 minutes and (b) at T3 for 3 minutes, respectively. Lines 53 and 54 show an inflection point around 270 seconds, and line 55 shows an inflection point around 320 seconds, due to the difference in soots being burnt off within the filter. As illustrated by Lines 52 and 54, significantly lower soot levels in the filter can be attained at the end of the 10 minute regeneration cycle for such hybrid two-stage regeneration cycles. Moreover, by utilizing lower regeneration temperatures in the first phase and burning off some soot, and then turning to higher regeneration temperatures in the second phase of a two-stage cycle, results in a safer operation inside the filter because only lesser amounts of soot are exposed to the higher temperatures, thus reducing the possibility of uncontrolled or undesirable rates of soot burn off.

Therefore, utilizing a high NOx exhaust gas concentration actively at elevated temperatures improves overall regeneration efficiency and reduces the risk of an uncontrolled regeneration by reducing the soot trapped within and on the particulate filter at a reduced temperature from that typically associated with uncontrolled regenerations.

Table 1 sets forth the soot loading and conditions for several NOx regenerations and regeneration efficiencies, and specifically the NOx impact on active controlled regenerations and the effects on soot loading. The soot loadings and regeneration efficiencies, calculated by dividing the difference in weight of a soot loaded filter and an at least partially regenerated filter by the completely unloaded filter weight, as set forth in Table 1, are measured by weighing the filter on a scale before and after the regeneration process.

TABLE 1

|   | Total Regeneration Time [min] | Soot Loading [g/L] Before Reg. | Regen Effic. [%] | Time @ 550° C. [min] | Time @ 600° C. [min] | NOx into DPF [ppm] |
| --- | --- | --- | --- | --- | --- | --- |
| Staged Regen 1 | 15 | 3.20 | 85 | 10 | 5 | 1350 |
| Staged Regen 2 | 15 | 4.48 | 82 | 10 | 5 | 1350 |
| Controlled Regen 3 | 15 | 4.48 | 79 | 15 | 0 | 1350 |
| Controlled Regen 4 | 15 | 4.48 | 89 | 0 | 15 | 1350 |
| Controlled Regen 5 | 10 | 4.64 | 66 | 10 | 0 | 1350 |
| Controlled Regen 6 | 10 | 4.48 | 80 | 0 | 10 | 1350 |
| Controlled Regen 7 | 5 | 4.64 | 24 | 5 | 0 | 1350 |
| Controlled Regen 8 | 5 | 4.40 | 42 | 0 | 5 | 1350 |
| Controlled Regen 9 | 15 | 4.64 | 76 | 15 | 0 | 1350 |
| Controlled Regen 10 | 15 | 4.32 | 33 | 15 | 0 | 380 |

TABLE 1-continued

|  | Total Regeneration Time [min] | Soot Loading [g/L] Before Reg. | Regen Effic. [%] | Time @ 550° C. [min] | Time @ 600° C. [min] | NOx into DPF [ppm] |
|---|---|---|---|---|---|---|
| Controlled Regen 11 | 15 | 4.48 | 39 | 15 | 0 | 380 |
| Controlled Regen 12 | 15 | 4.96 | 61 | 0 | 15 | 380 |
| Staged Regen 13 | 15 | 4.48 | 46 | 10 | 5 | 380 |

Figure 6A:
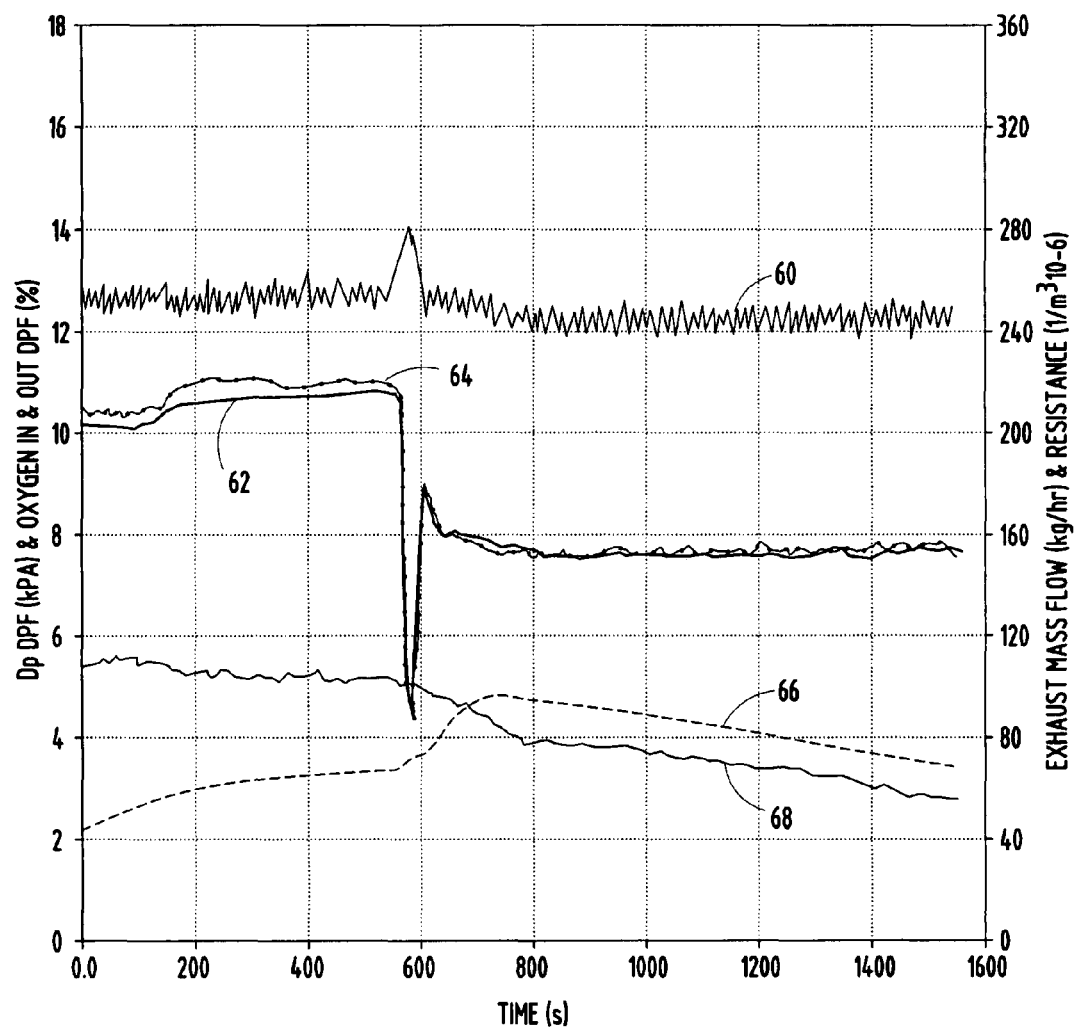
FIGS. 6A and 6B are graphs of test results using lower and higher NOx levels.
Figure 6B:
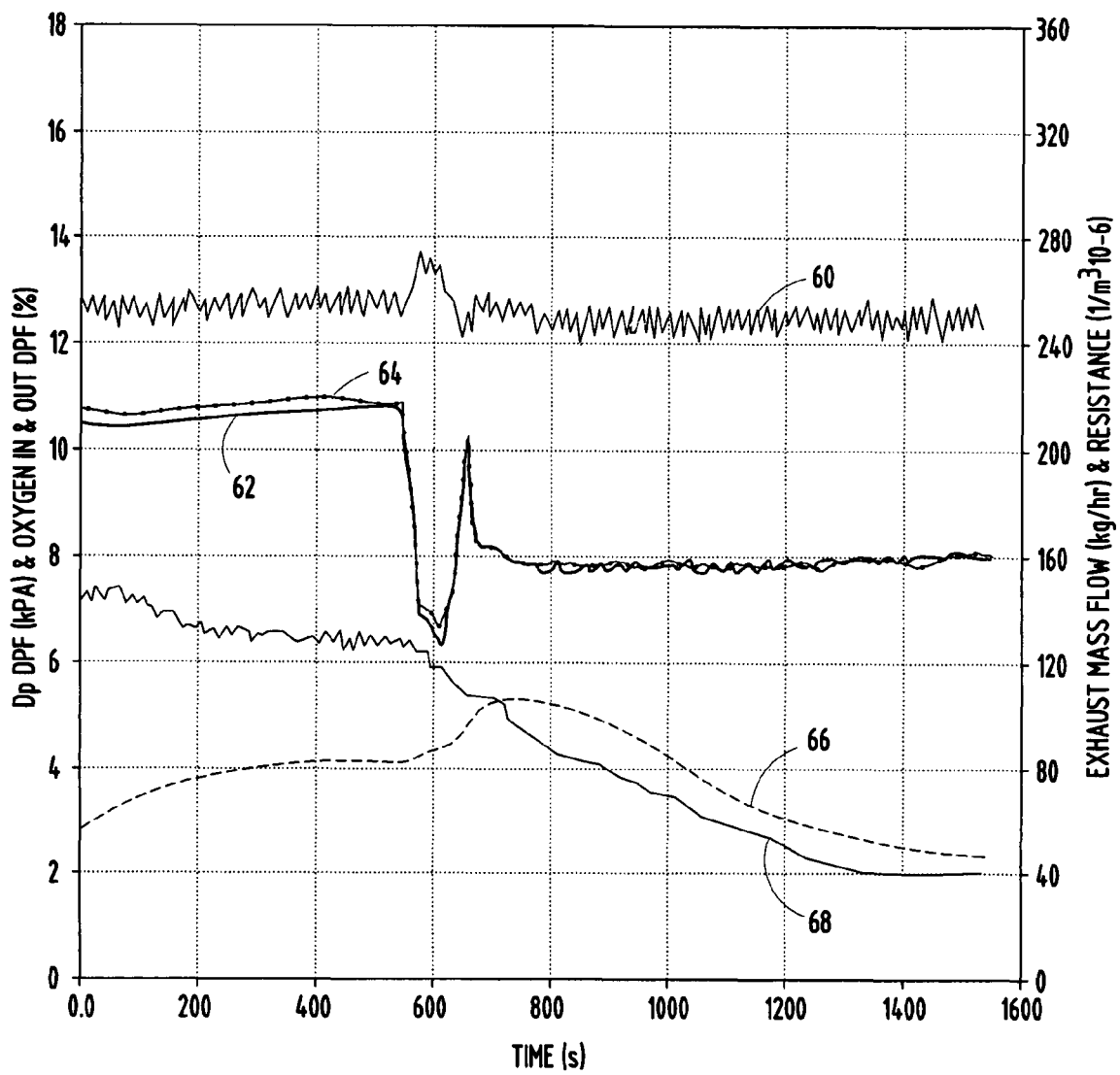

A relatively-low NOx condition, e.g. 450 ppm, controlled regeneration, is illustrated in FIG. 6A, and a relatively-high NOx condition, e.g., 1450 ppm, controlled regeneration, is illustrated in FIG. 6B. In FIGS. 6A and 6B, measured values of mass flow rate 60, oxygen into the filter 62, oxygen out of the filter 64, pressure drop across the filter 66, and relative resistance through the filter 68 are shown. The relatively-low NOx condition, e.g. 450 ppm, controlled regeneration, illustrated in FIG. 6A, as compared to the relatively-high NOx condition, e.g., 1450 ppm, controlled regeneration, illustrated in FIG. 6B, indicates a superior reduction in relative resistance of flow of the exhaust gas stream through the particulate filter and therefore soot loading in the filter at the relatively high NOx condition, because the relative resistance of flow in the filter varies according to soot loading. FIGS. 6A and 6B further comparatively illustrate that the engine conditions to achieve the relatively-high NOx condition and improved regeneration were similar except for the NOx level within the exhaust gas stream.

Figure 7A:
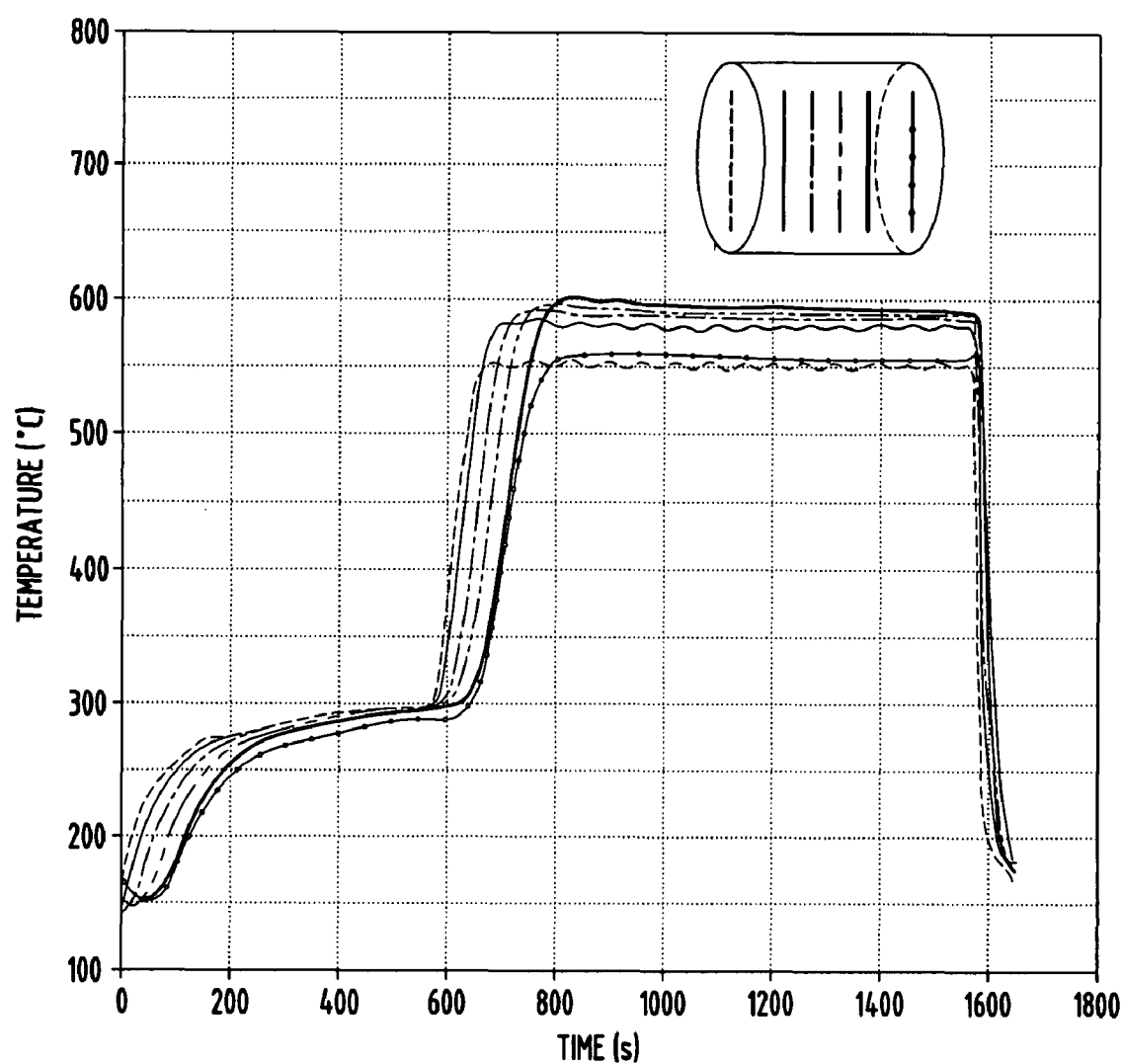
FIGS. 7A and 7B are graphs of thermal profiles for two regeneration methods, including regenerations conducted at a relatively low NOx level and a relatively high NOx level, respectively.
Figure 7B:
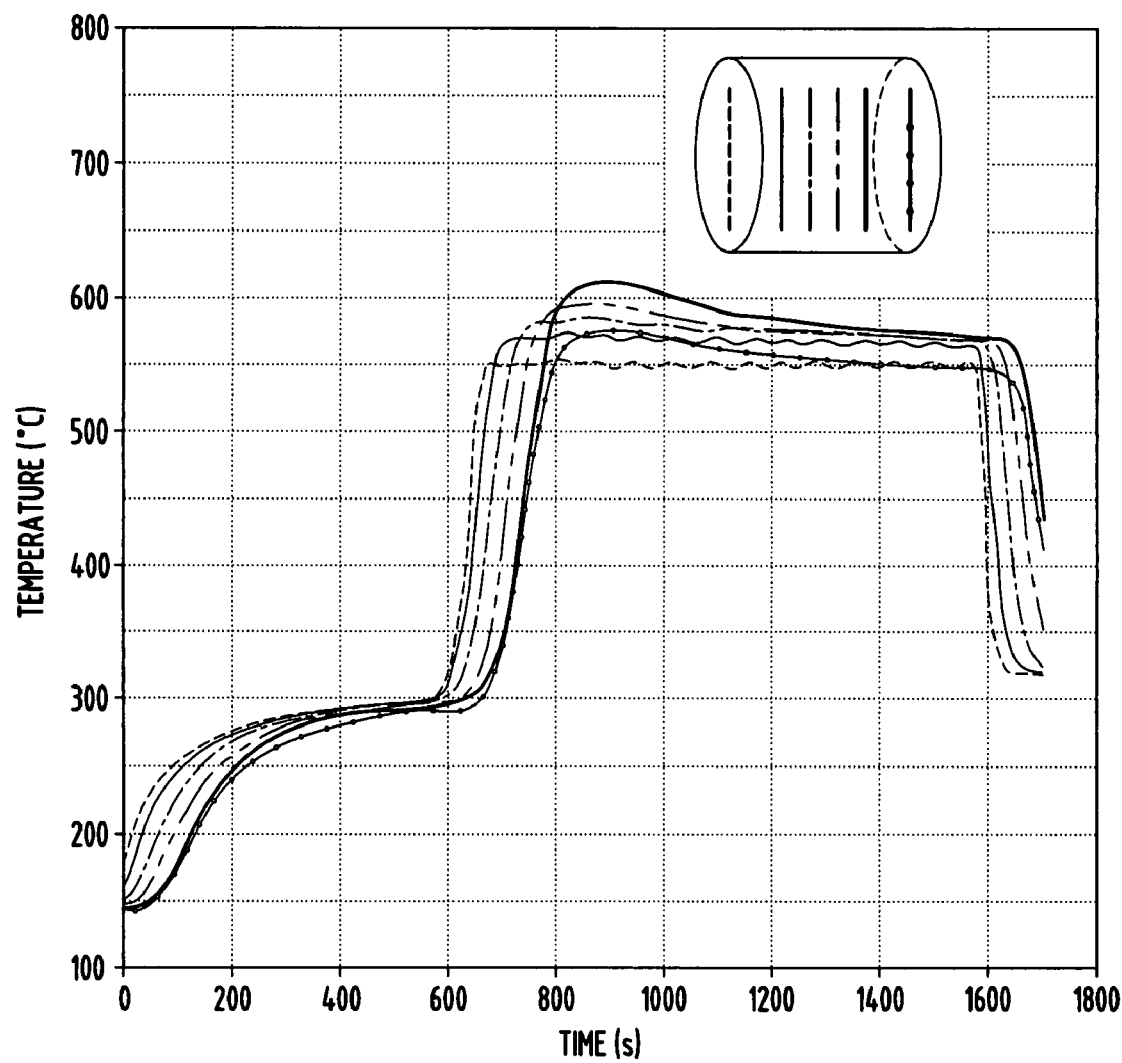

The thermal profile of the relatively-low, e.g., 380 ppm, NOx condition and the relatively-high, e.g., 1350 ppm, NOx condition are illustrated in FIGS. 7A and 7B, respectively with the keys of FIGS. 7A and 7B indicating the locations within the particulate filter at which temperature levels were monitors, and wherein the inlet location of the particulate filter is positioned to the left and the outlet to the right on the key. The thermal profiles of the particulate filter exposed to the relatively-low and relatively-high NOx conditions are generally similar in shape, however, improved regeneration efficiency may be achieved at a lower temperature, thereby resulting in reduced thermal stress on the filter.

Figure 8:
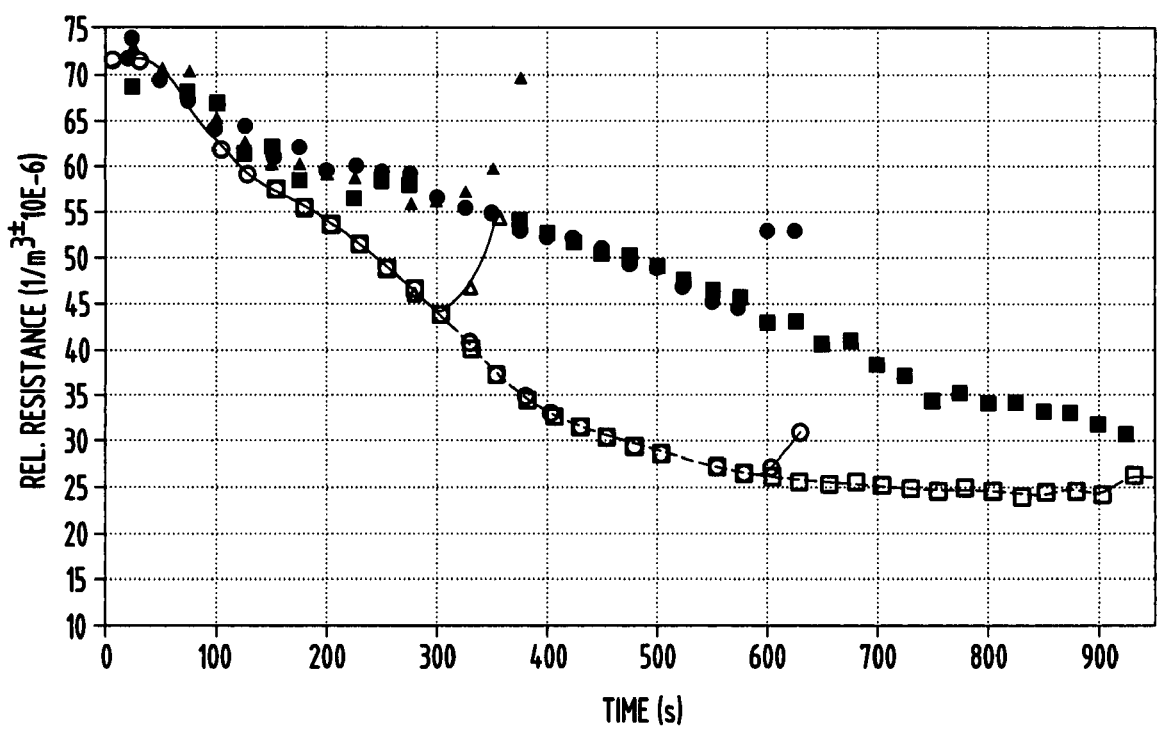
FIG. 8 graphically illustrates the relative resistance of flow of an exhaust gas stream through a particulate filter during regeneration at higher and tower NOx levels.

FIG. 8 graphically illustrates the relative resistance of flow of the exhaust gas stream through the particulate filter during regeneration of the filter, which is indicative of the soot loading in the filter. Under various tests, at the inlet of the particulate filter, the gas stream temperature was 550° C., the $O_2$ concentration in the gas stream was 8%, the exhaust gas stream flow rate was 250 kg/h, and the initial soot loading was 4.5 g/L. FIG. 8 shows results for a relatively lower NOx inlet concentration of 380 ppm as indicated by the solid markers, and for a relatively higher NOx inlet concentration of 1350 ppm as indicated by the hollow markers. Triangle, circle and square markers show 5, 10, and 15 minute regeneration runs, respectively. The markers which lie significantly above their other related points indicate a period of time after the regeneration took place during which the filter was stabilized and handled for measurement. FIG. 8 shows that for higher NOx levels (1380 ppm), the relative resistance indicates a faster regeneration and lower ultimate soot loading toward the end of the regeneration as compared to lower NOx levels (380 ppm). The regeneration efficiency at the lower NOx level was 26%, 46%, and 65% after regeneration periods of 5, 10, and 15 minutes, respectively. The regeneration efficiency at the higher NOx level was 49%, 76%, and 89% after regeneration periods of 5, 10, and 15 minutes, respectively.

Figure 9:
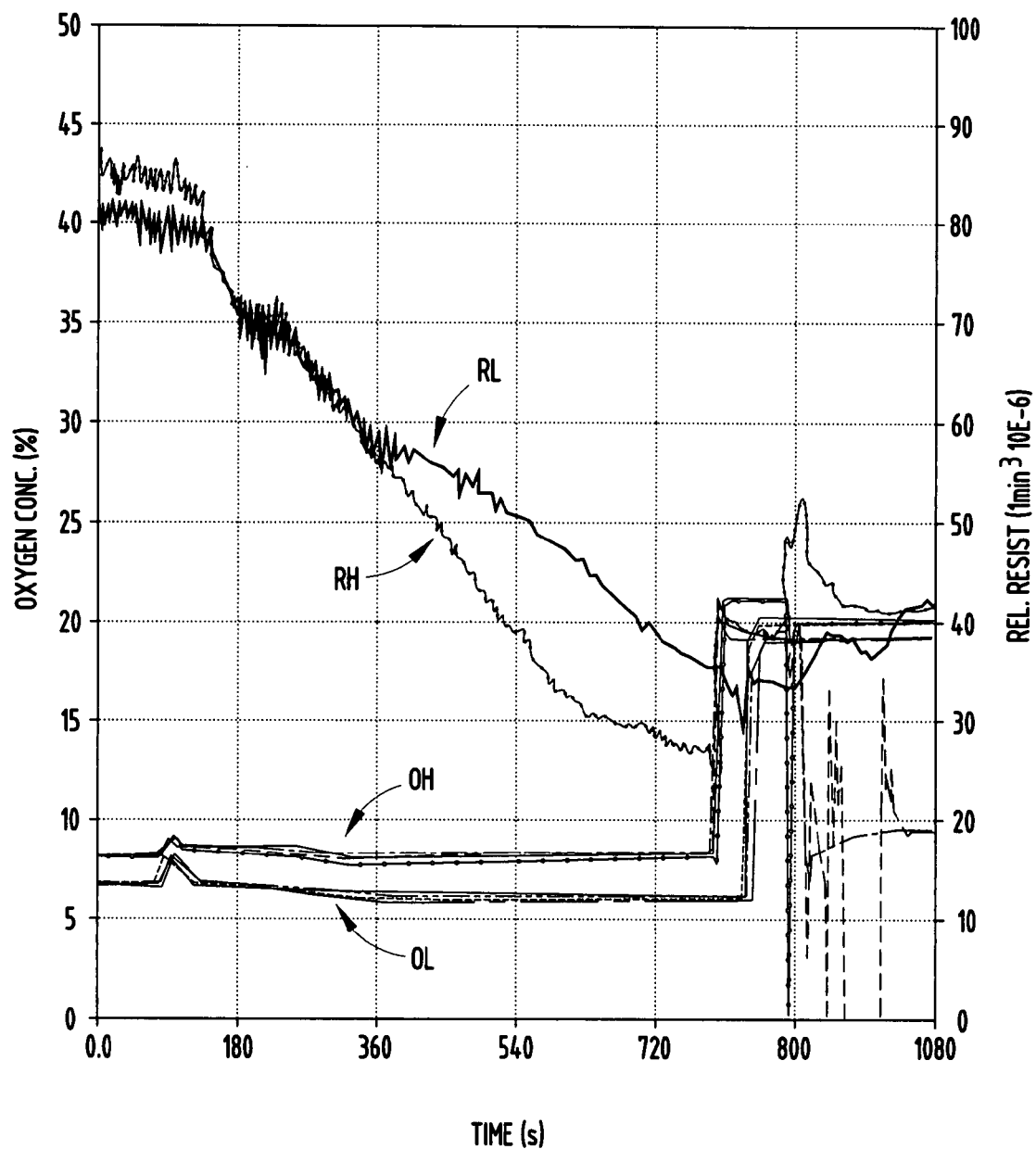
FIG. 9 is a graph of time vs. oxygen concentration vs. relative flow resistance, and shows the advantage of varying oxygen levels within the exhaust gas stream.

FIG. 9 demonstrates a benefit of higher oxygen concentrations during regenerations where NOx is supplied at relatively higher concentrations. Specifically, FIG. 9 shows the difference in $O_2$ levels, and that higher $O_2$ levels result in a higher regeneration efficiency, with both under similar NOx conditions. Various tests were run at relatively higher (about 8%) $O_2$ concentration levels (OH) and at relatively lower (about 6-7%) $O_2$ concentration levels (OL), all at an inlet NOx concentration of 1350 ppm. The relative resistance of flow of the exhaust gas stream through the particulate filter during regeneration of the filter, which is indicative of the soot loading, for low O2 levels (RL) and for high O2 levels (RH) indicate a faster regeneration and lower ultimate soot loading toward the end of the regeneration at higher O2 levels. The regeneration efficiency at low O2 levels was 60%, and the regeneration efficiency at high O2 levels was 76%. These findings were generated with a cylindrically-shaped diesel particulate filter measuring 9 inches in diameter and 12 inches in length, having 200 cells per square inch, comprised of cordierite, and as available from Corning Incorporated of Corning, N.Y. as DuraTrap® CO. In certain instances, as specified herein, the diesel particulate filter was coated with an oxidation catalyst as available from Johnson Matthey Incorporated of Wayne, Pa., as an Alpha coating within a system having an initial soot loading of 4.5 g/L, and 250 kg/h exhaust gas stream flow rate at the inlet of the particulate filter.

Figure 10:
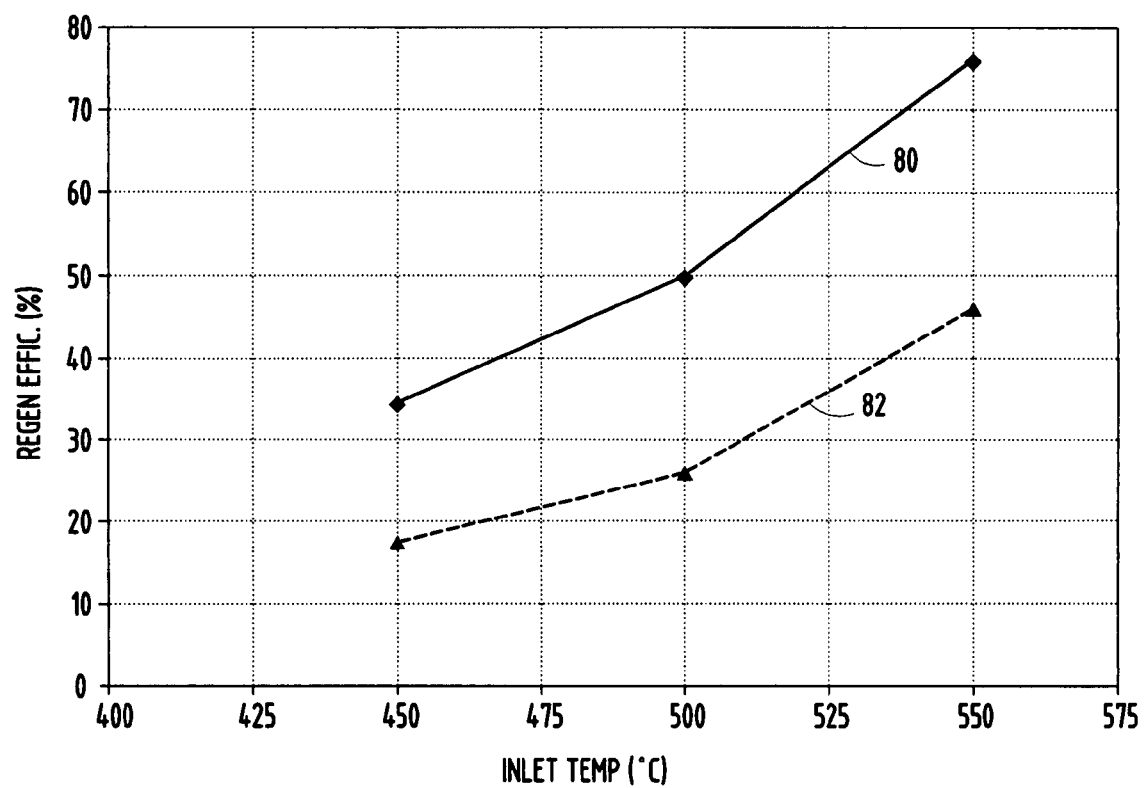
FIG. 10 is a graph of inlet temperature of the exhaust gas flow vs. regeneration efficiency.

FIG. 10 shows that significant advantage, as reflected by regeneration efficiency, is achieved when using relatively-high, e.g. 1500 ppm, NOx level vs. a relatively-low, e.g., 500 ppm, NOx levels (lines 80 and 82, respectively) during regeneration over a variety of inlet temperatures, beyond those typically employed during passive regeneration processes. Specifically, varied temperatures of the inlet gas stream were applied from a range between 450° C. and 550° C. with a ramp rate of approximately 3° C./s. Each regeneration cycle was 10 minutes in length with a soot loading target of 4 g/L. As a result, increasing the NOx enables the use of safer inlet temperatures to prevent failure of the diesel particulate filters and an increased overall soot mass limit.

Figure 11:
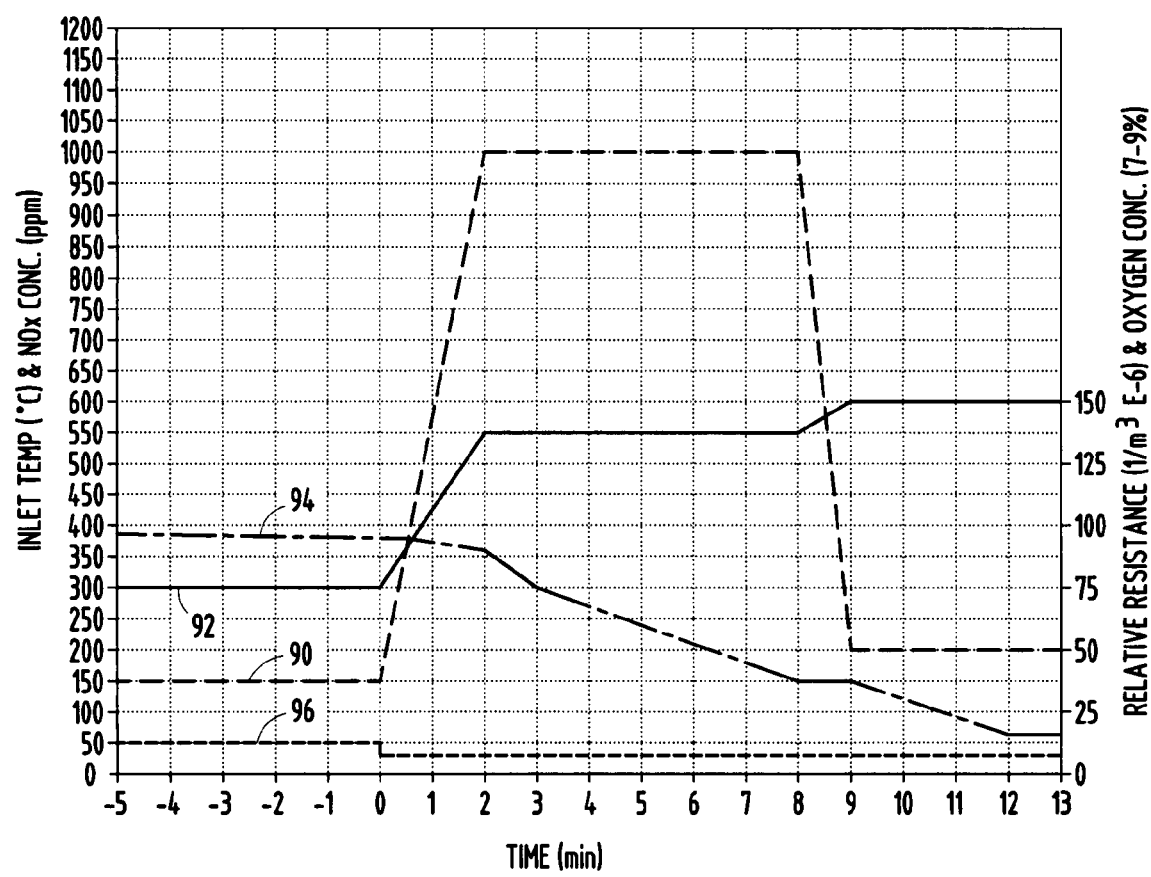
FIG. 11 is a graph of regeneration time vs. inlet temperature of the exhaust gas stream vs. relative resistance and oxygen concentrations for a staged regeneration process.

In some embodiments, the present inventive method may utilize a NOx removal (e.g, DeNOx) after-treatment downstream of the diesel particulate filter, i.e. a process step of treating the gas stream exiting the diesel particulate filter, so as to manage NOx emissions, for example in case the NOx levels required to achieve the advantage in the presently disclosed regeneration strategy exceed emission regulations. Advanced regeneration strategies may be utilized to minimize the NOx emissions impact, while still taking advantage of the relatively-high regeneration performance achieved with the elevated NOx levels. An embodiment comprising a staged regeneration strategy illustrated in FIG. 11, wherein the stage regeneration strategy utilizes relatively-high, e.g., 1000 ppm, NOx levels only for relatively-tow temperature, e.g., 550° C. portions of the overall regeneration stage. FIG. 11 shows inlet NOx concentration 90, DPF inlet temperature 92, relative resistance 94, and oxygen concentration 96; in stage 1, from 2 minutes to 8 minutes, the NOx level is 1000 ppm and the DPF inlet temperature is 550° C., and in stage 2, from 9 minutes to 13 minutes, the NOx level is 200 ppm and the DPF inlet temperature is 600° C.; and the regeneration efficiency in stage 1 was about 65 to 70%, and the regeneration efficiency in stage 2 was greater than about 90%.

Table 2 sets forth numerous soot loadings and regeneration efficiencies achieved at various inlet temperatures, and NOx levels and $O_2$ levels for a coated particulate filter.

TABLE 2

Controlled Regenerations For Coated Particulate Filter
10 Minutes

| DPF Inlet Temp. [° C.] | NOx Level at Inlet of DPF [ppm] | $O_2$ at Inlet of DPF [%] | Soot Loading [g/l] | Regen Effic. [%] |
|---|---|---|---|---|
| 450 | 780 | 10 | 3.8 | 23.6 |
| 450 | 340 | 10 | 4.1 | 10.6 |
| 450 | 200 | 7 | 4.0 | 14.7 |
| 500 | 350 | 10 | 3.8 | 20.3 |
| 500 | 730 | 10 | 3.8 | 36.3 |
| 500 | 200 | 8 | 4.0 | 16.2 |
| 550 | 740 | 9 | 3.8 | 51.8 |
| 550 | 350 | 9 | 4.0 | 33.1 |
| 550 | 200 | 7 | 3.9 | 28.2 |
| 600 | 200 | 6 | 3.8 | 55.1 |
| 600 | 750 | 9 | 4.6 | 85.2 |
| 600 | 200 | 6 | 4.0 | 57.6 |
| 600 | 350 | 8 | 3.8 | 65.3 |
| Bare | | | | |
| 500 | 750 | 10 | 3.9 | 15.5 |
| 500 | 200 | 8 | 3.9 | 8.2 |
| 550 | 750 | 9 | 3.9 | 27.1 |
| 550 | 200 | 7 | 4.2 | 18.5 |

The present inventive method for regenerating a diesel particulate filter helps to reduce the amount of particulate matter contained in or on a diesel filter in a safer and more time efficient manner. Specifically, temperature ranges of less than those typically sufficient to trigger an uncontrolled regeneration may be utilized to at least partially regenerate the associated particulate filter, thereby reducing the amount of particulate matter trapped within the particulate filter to levels at which a higher temperature regeneration scheme may be employed, thereby completely regenerating the filter. Further, the soot-loading interval can increase for active regenerations, resulting in longer intervals between regenerations and better fuel economy. The present inventive regeneration method improves the overall filter management strategy, providing safer regeneration conditions, more effective utilization of energy, and an increased flexibility to manage higher soot loads within the filters in a safer manner.

Figure 12:
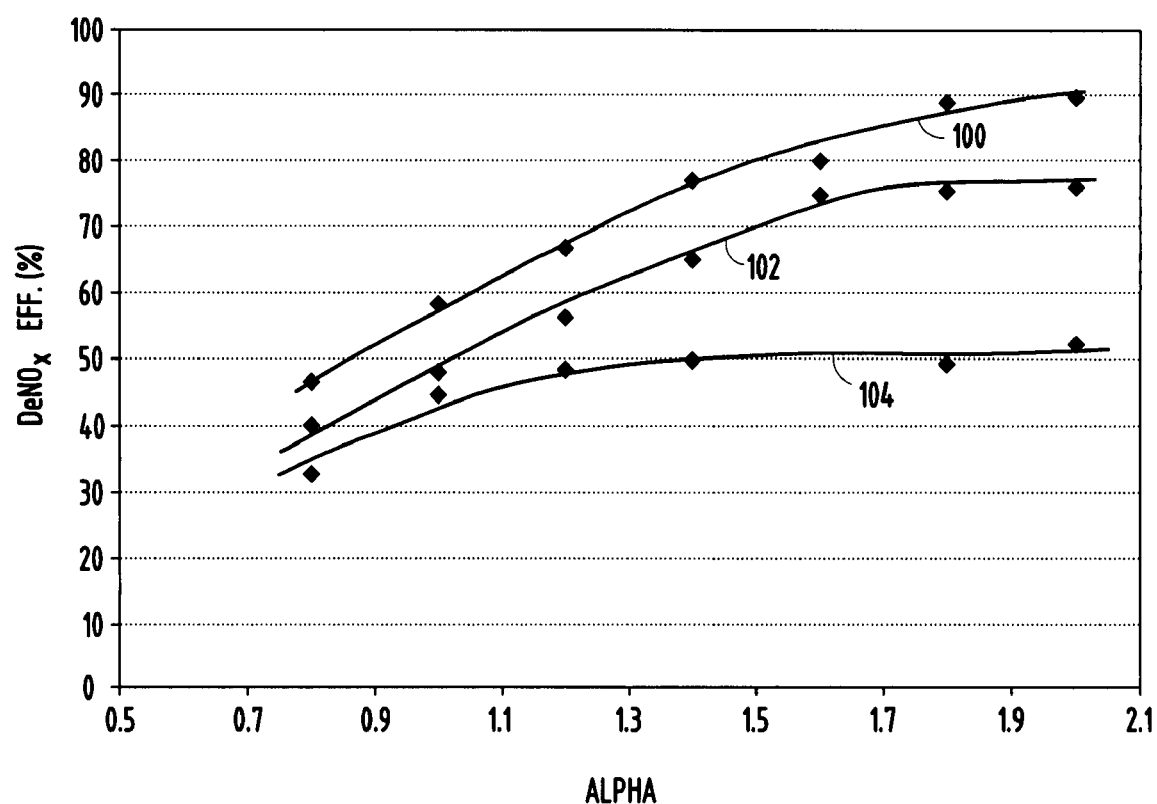
FIG. 12 graphically illustrates SCR DeNOx efficiency in an embodiment disclosed herein.

FIG. 12 graphically illustrates the DeNOx efficiency (in %) versus the ratio of inlet ammonia concentration divided by the inlet NOx concentration, wherein the inlet NOx concentration was 800 ppm NOx, at temperatures of 500, 550, and 600° C. (lines 100, 102, and 104, respectively in FIG. 12) at the inlet to an SCR device. The SCR device comprised a cordierite backbone, 400 cells per square inch and wall thickness of 4 mil, with a Johnson Mathey Cu-Zeolite washcoat loading of 190 g/t that underwent a 650° C., 5 hour thermal aging. FIG. 12 illustrates that even at high NOx levels such as 800 ppm and at high temperatures (500-600° C.), acceptably high levels of NOx removal can be achieved according to the present invention.

According to some embodiments disclosed herein, the temperature of the gas stream at the inlet of the diesel particulate filter is between 450° C. and 600° C., and the gas stream downstream of the diesel particulate filter is treated via selective catalytic reduction sufficient to remove preferably at least 50%, more preferably at least 60%, even more preferably at least 70%, still more preferably at least 75%, and yet more preferably at least 80% of the NOx from the gas stream.

Figure 13:
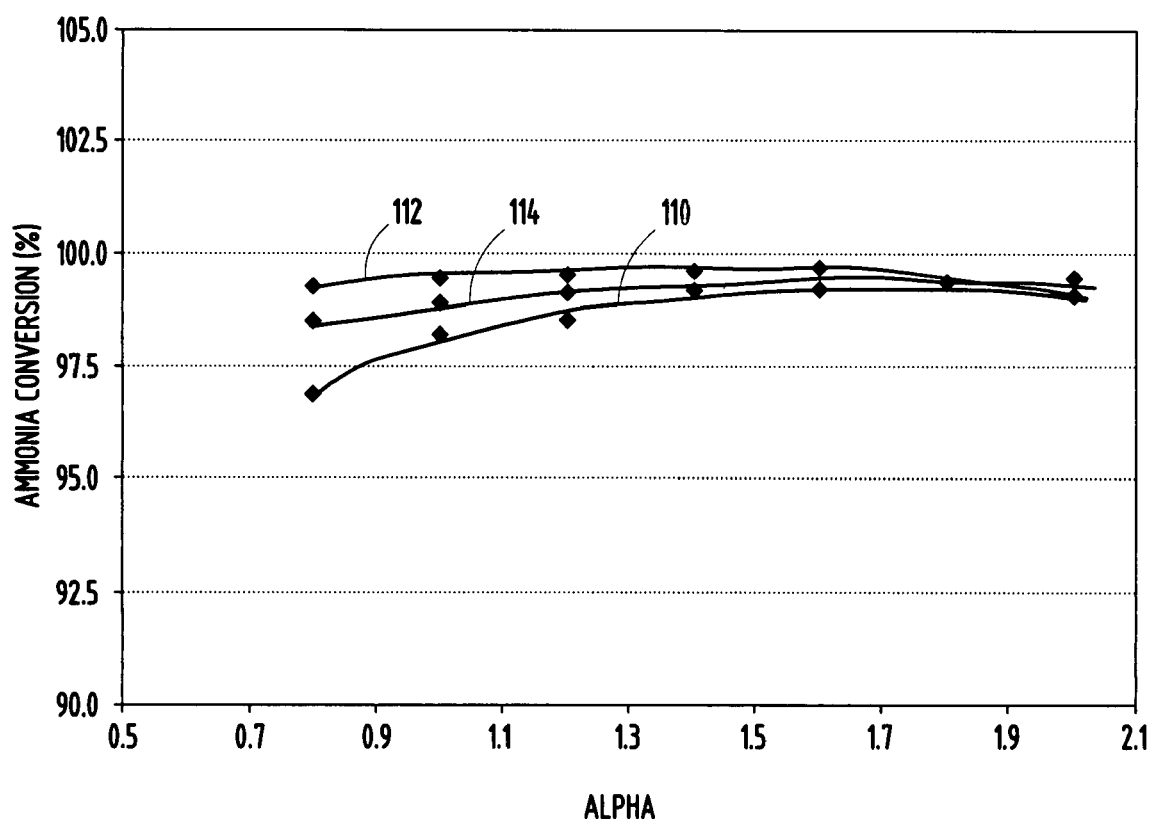
FIG. 13 graphically illustrates SCR ammonia conversion in an embodiment disclosed herein.

FIG. 13 graphically illustrates the ammonia conversion (in %) versus reductant dosing for the conditions and for the SCR device described for FIG. 12, wherein lines 110, 112, and 114 correspond to inlet temperatures of 500, 550, and 600° C., respectively. FIG. 13 illustrates that even at higher reductant dosing levels, an acceptably high ammonia conversion rate can be achieved according to the present invention.

According to some embodiments disclosed herein, the temperature of the gas stream entering the SCR device is between 500 and 600° C., and preferably the selective catalytic reduction has an ammonia conversion of greater than 95%, more preferably greater than 97%, and even more preferably greater than 98%.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A method for at least partially regenerating a diesel particulate filter, wherein the diesel particulate filter comprises an inlet, an outlet, and a porous body comprising a plurality of porous walls disposed between the inlet and the outlet, wherein a gas stream flows into the inlet, through the diesel particulate filter, and out of the outlet, and wherein the porous walls contain an amount of carbon soot trapped in or on the porous walls, the method comprising:
    elevating a temperature of the gas stream flowing into the inlet of the diesel particulate filter to greater than or equal to 450° C. at the inlet of the diesel particulate filter;
    wherein the gas stream at the inlet of the diesel particulate filter contains an amount of NOx of equal to or greater than 300 ppm, and an amount of $O_2$ equal to or greater than 5% vol;
    wherein the temperature of the gas stream flowing into the inlet of the diesel particulate filter is between 450° C. and 550° C. for a first period of time of less than or equal to 15 minutes, wherein the temperature of the gas stream is subsequently elevated to a temperature of greater than or equal to 550° C. for a second period of time, and wherein the amount of NOx is equal to or less than 300 ppm at the inlet of the diesel particulate filter during the second period, thereby burning the soot in the diesel particulate filter.

2. The method of claim 1, wherein the gas stream at the inlet of the diesel particulate filter contains an amount of $O_2$ of equal to or greater than 7% vol.

3. The method of claim 1, wherein the gas stream downstream of the diesel particulate filter is treated via selective catalytic reduction.

4. The method of claim 1, wherein the temperature of the gas stream is greater than or equal to 500° C. at the inlet of the diesel particulate filter, and the amount of NOx is greater than or equal to 750 ppm at the inlet of the diesel particulate filter.

5. The method of claim 1, wherein the gas stream at the inlet of the diesel particulate filter contains an amount of NOx of greater than or equal to 500 ppm.

6. The method of claim 5, wherein the gas stream at the inlet of the diesel particulate filter contains an amount of NOx of greater than or equal to 750 ppm.

7. The method of claim 1, wherein the diesel particulate filter is an oxide filter.

8. The method of claim 7, wherein the porous walls of the oxide filter have an uncoated bulk density of less than or equal to about 700 grams/liter.

9. The method of claim 8, wherein the porous walls of the oxide filter have an uncoated bulk density of less than or equal to about 600 grams/liter.

10. The method of claim 1, wherein the gas stream downstream of the diesel particulate filter is treated via selective catalytic reduction sufficient to remove at least 50% of the NOx from the gas stream.

11. The method of claim 10, wherein the selective catalytic reduction occurs in an SCR device, and wherein the temperature of the gas stream entering the SCR device is between 500 and 600° C.

12. The method of claim 11, wherein the selective catalytic reduction has an ammonia conversion of greater than 95%.

13. A method for at least partially regenerating a diesel particulate filter, wherein the diesel particulate filter comprises an inlet, an outlet, and a porous body comprising a plurality of porous walls disposed between the inlet and the outlet, wherein a gas stream flows into the inlet, through the diesel particulate filter, and out of the outlet, and wherein the porous walls contain an amount of carbon soot trapped in or on the porous walls, the method comprising:
elevating a temperature of the gas stream flowing into the inlet of the diesel particulate filter to less than or equal to 550° C. at the inlet of the diesel particulate filter;
wherein the gas stream at the inlet of the diesel particulate filter contains an amount of $O_2$ of equal to or greater than 5% vol., and wherein a burn rate of the soot from the porous walls is greater than or equal to 3.8 grams/liter/hour, wherein the burn rate is maintained at least until the amount of the soot trapped in or on the porous walls is less than or equal to 6 grams/liter, and then the temperature of the gas stream flowing into the inlet of the diesel particulate filter is elevated to 550° C. or more.

14. The method of claim 13, wherein the burn rate is maintained for a first period of time of less than or equal to 15 minutes.

15. The method of claim 13, wherein the porous walls are comprised of aluminum titanate.

16. The method of claim 13, wherein the burn rate is maintained at least until the amount of the soot trapped in or on the porous walls is less than or equal to 4 grams/liter.

17. The method of claim 13, wherein the burn rate is greater than or equal to 4.2 grams/liter/hour.

18. The method of claim 17, wherein the burn rate is greater than or equal to 4.6 grams/liter/hour.

19. The method of claim 13, wherein the burn rate is maintained at least until the amount of soot trapped in or on the porous walls is less than or equal to 3 grams/liter.

20. The method of claim 19, wherein the porous walls are comprised of cordierite.

21. The method of claim 13, wherein the gas stream at the inlet of the diesel particulate filter contains an amount of NOx equal to or greater than 300 ppm.

22. The method of claim 21, wherein the amount of NOx is greater than or equal to 500 ppm.

23. The method of claim 22, wherein the amount of NOx is greater than or equal to 750 ppm.

24. A method for at least partially regenerating a diesel particulate filter, wherein the diesel particulate filter comprises an inlet, an outlet, and a porous body comprising a plurality of porous walls disposed between the inlet and the outlet, wherein a gas stream flows into the inlet, through the diesel particulate filter, and out of the outlet, and wherein the porous walls contain an amount of carbon soot trapped in or on the porous walls, the method comprising:
elevating a temperature of the gas stream flowing into the inlet of the diesel particulate filter to less than or equal to 550° C. at the inlet of the diesel particulate filter;
wherein the gas stream at the inlet of the diesel particulate filter contains an amount of $O_2$ of equal to or greater than 5% vol., and wherein a burn rate of the soot from the porous walls is greater than or equal to 3.8 grams/liter/hour, wherein the burn rate is maintained at least until the amount of the soot trapped in or on the porous walls is less than or equal to 4 grams/liter, and then the temperature of the gas stream flowing into the inlet of the diesel particulate filter is elevated to 550° C. or more.

* * * * *